M. LEVY.

RETORTS FOR THE MANUFACTURE OF GAS FROM WOOD.

No. 7,375. Reissued Oct. 31, 1876.

Witnesses:
Charles Thurman
Geo. Lilly

Inventor:
Mark Levy.
by Geo. W. Dyer
Atty.

UNITED STATES PATENT OFFICE

MARK LEVY, OF NEW YORK, N. Y., ASSIGNOR TO A. H. NONES.

IMPROVEMENT IN RETORTS FOR THE MANUFACTURE OF GAS FROM WOOD.

Specification forming part of Letters Patent No. 982, dated April 9, 1861; reissue No. 7,375, dated October 31, 1876; application filed April 19, 1876.

*To all whom it may concern:*

Be it known that I, MARK LEVY, of New York, in the county and State of New York, have invented a new and Improved Retort for Making Illuminating Gas from Wood or other similar vegetable materials; and I do hereby declare that the following is a full and exact description of the construction and operation of the retort, reference being had to the accompanying drawings, and to the letters of reference marked thereon.

Figure 2:
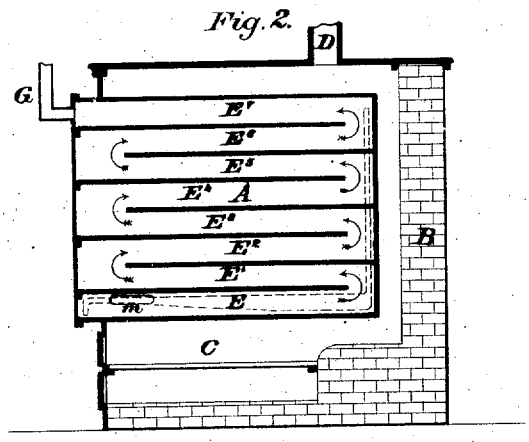
Figure 1:
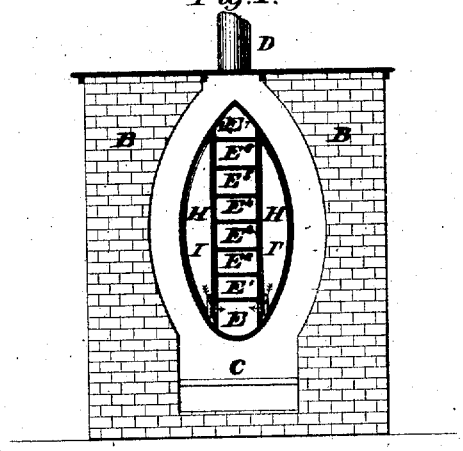
Figure 3:
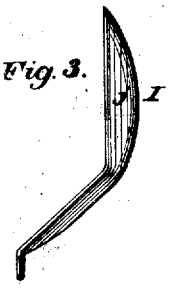

Figure 1 represents a vertical cross-section of the bench containing the retort. Fig. 2 shows a vertical longitudinal section of the same; and Fig. 3 is a separate view of the scrapers.

Similar letters designate the same parts in each figure.

The nature of my invention consists in the construction of a retort containing a series of inclosed retorts, connected together by passages, the lower inclosed retort having passages connecting with the side chambers of the main retort, whereby gases generated in such side chambers, and in the lower retort, are forced to travel long distances through the inclosed retorts, and in such travel become combined and converted into a homogeneous and fixed illuminating gas.

In the accompanying drawings, A is the retort, preferably formed in the elliptical shape in cross-section, and of any length desired, and supported on its ends, with its longest axis perpendicular. This retort is set in brick-work B, of any suitable construction, but preferably with an arched top, as shown, and having a furnace or fire-pot, C. The smoke or gases from this furnace or fire-box escape through the exit D. The center of the retort is taken up by a series of inclosed retorts, E $E^1$ $E^2$, &c., leaving upon each side of the retort a chamber, H. G is a stand-pipe, connected with the upper inclosed retort E, to lead the generated gases away from the retort to be purified.

The chambers H in the retort A are filled with wood or similar vegetable substances, from which the illuminating-gas is to be generated, and the mouths of the retorts being properly closed, the gases generated in the chamber H pass through the opening *m*, forming a communication between the chamber H and the front end of the inclosed retort E, into said retort, and circulate back and forth through the inclosed retorts E $E^1$ $E^2$ $F^3$, &c., and are finally led away from the upper one by the stand-pipe G to be purified.

The shape or form of the retort being high and narrow, exposes a large extent of heating-surfaces, and insures great durability.

I I′ represent scrapers, of the form shown in Fig. 3, having a head, *j*, turned at right angles to the main body, and corresponding in shape with the form of a cross-section of one of the chambers H. When the scraper is in position it occupies very little room in the chamber H, and when it is drawn out, the head *j* rakes out all the contents of said chamber.

As the operation of distillation goes on, the pyroligneous acid, tar, and pitchy parts of the wood expressed by the heat, flow by gravity down into the lower retort E, which, being directly exposed to the fire, will partially convert the produced tar, pitch, and pyroligneous acid into gas. The gas produced from the wood passing into the lower inclosed retort, will take up, dilute, and carry along the gas produced from the tar, pitch, and pyroligneous acid, and the two gases, in passing through the several inclosed retorts, will become thoroughly mixed. When these gases reach the upper retort, which is very highly heated by reverberation from the arched top of the bench, they will be there combined, and become a single homogeneous fixed or permanent gas, and as such pass off into the stand-pipe. The lower inclosed retort, being highly heated, volatilizes the substances which are in such inclosed retort, and the gaseous vapors of the same are overtaken and taken up by the great volume of the lighter wood gases, which are thrown off at a high temperature, and, passing rapidly into the upper inclosed retort, are there checked and detained, the area of the passage in the stand-pipe G being less than that of the upper inclosed retort, and while thus detained are subjected to an intense heat, before explained, which converts these gases into a single fixed gas.

What I claim as my invention, and desire to secure by Letters Patent, is—

1. In combination with a retort, a series of inclosed retorts occupying the center of the main retort, and chambers on each side of the same, substantially as described.

2. In combination with a retort, a series of inclosed retorts placed one above the other, connecting with each other at opposite ends, substantially as described.

3. In combination with a retort, a lower inclosed retort, connecting with the side chambers of the main retort at the front thereof substantially as described.

MARK LEVY.

Witnesses:
JOHN M. HARRINGTON,
C. T. BRUEN.